United States Patent [19]

Schudlich et al.

[11] Patent Number: 4,518,365
[45] Date of Patent: May 21, 1985

[54] DEVICE FOR NIPPLING ACTIVE ELECTRODE SECTIONS ONTO A COMBINATION ELECTRODE

[75] Inventors: Kurt Schudlich, Witten-Annen; Günter Vielstich, Witten-Heven; Josef Mühlenbeck; Josef Otto, both of Wetter; Hannsgeorg Bauer, Witten-Bommern; Dieter H. Zöllner, Schwaig b. Nürnberg; Friedrich Rittmann, Rückersdorf b. Nürnberg, all of Fed. Rep. of Germany

[73] Assignee: ARC Technologies Systems, Ltd., Grand Cayman, Cayman Islands

[21] Appl. No.: 367,871

[22] Filed: Apr. 13, 1982

[51] Int. Cl.³ .............................................. H01J 9/18
[52] U.S. Cl. .................................... 445/67; 81/57.15
[58] Field of Search .... 445/67; 81/57.38, 57.15–57.21

[56] References Cited

U.S. PATENT DOCUMENTS

| | | | |
|---|---|---|---|
| 1,802,210 | 4/1931 | Kinser | 81/57.16 |
| 2,322,918 | 6/1943 | Brooke | 81/57.15 |
| 3,550,485 | 12/1970 | Dickmann | 81/57.15 |
| 3,935,760 | 2/1976 | Taylor | 81/55 |
| 4,380,181 | 4/1983 | Bunyan | 81/57.38 |

Primary Examiner—Kenneth J. Ramsey
Assistant Examiner—Kurt Rowan
Attorney, Agent, or Firm—Woodrow W. Ban

[57] ABSTRACT

A device for nippling active electrode sections onto a combination electrode permanent upper section employing screw nipples to form the connection comprising an outer, essentially hollow cylindrical element and an inner hollow cylindrical element co-axially with in said outer element. The inner element is configured to couple with the connector element arranged on the upper end of the permanent section of said combination electrode. A drive is provided by means of which the inner element is rotatable in relation to the outer element around its axis.

19 Claims, 7 Drawing Figures

DEVICE FOR NIPPLING ACTIVE ELECTRODE SECTIONS ONTO A COMBINATION ELECTRODE

FIELD OF THE INVENTION

The invention concerns a device for nippling active electrode sections onto a permanent upper section of a combination electrode by means of screw nipples which form the connection.

BACKGROUND OF THE INVENTION

With electric arc furnaces, especially for the manufacture of electrosteel, electrodes are used which possess substantial weight, especially in the case of large kettle sizes.

As a result of the efforts made recently to save energy, so-called combination electrodes have been proposed comprising an upper metallic permanent section and one or more active electrode sections composed of consummable materials. While the shaft-like upper metal section consists of copper or the like and has a cooling means, the active electrode sections are usually made from graphite. Combination electrodes of this type are, for example, shown in EP-OS No. 10 305 and EP-OS No. 12 537.

After the consumption of an active electrode section, replacement is necessary. For replacement, the electrode must be removed from the furnace. Because of the weight of the electrodes, handling generally can only be done with the use of a heavy lifting appliance, such as a gantry crane. After the removal of the electrode from the furnace, the spent active electrode section must be unscrewed from the permanent top or upper section and a new active electrode section must be screwed onto the permanent upper section. But these processes generally are only carried out using a suitable helping device due in part to the short time available, and taking account of the need for humane working conditions.

In the case of a conventional, totally self-consuming electrode made of graphite for example, devices are known for nippling a new section onto a partially consumed electrode shaft. However, the nippling of conventional electrodes is performed differently than with combination electrodes. With conventional electrodes, the nippling of a new active electrode section takes place mainly at the top end of a substantially consumed electrode slab or shaft, the substantially consumed shaft remaining in the furnace. A new electrode section is moved using a lifting appliance, such as a shop crane, to a position over the electrode slab which is held in an electrode holder positioned upon the furnace. Then the new electrode section is lowered onto the top end of the electrode slab in the furnace, so that a screw nipple arranged either on the lower end of the new electrode section or on the top end of the electrode slab is employed to couple the new section to the electrode slab. Nippling of the new electrode section to the top end of the electrode slab is accomplished by rotating the new electrode section.

A known device for nippling of conventional electrodes (DE-OS No. 16 90 556) consists of two cylinders co-axially arranged one inside the other. The inner cylinder is drivingly rotatable in relation to the outer cylinder. The inner cylinder includes at its lower end chucks which are radially pressable onto the electrode section being nippled. The outer cylinder can be torsionally supported for coupling against the electrode holder which is fixed upon the furnace. This device makes possible the mechanical nippling up of an electrode section on an electrode held in an electrode holder fixed on the furnace.

Such a nippling device is relatively costly in its design. It has two electric motors, one arranged above the inner cylinder and intended to clamp the electrode section to the electrode slab by axial movement between the two cylinders, the other motor arranged near the lower end of the device on the outer cylinder, for rotating, by means of a worm gear, the inner cylinder for the nippling up process. Such a design not only results in a very great height for the nippling device, but also results in a large diameter near the furnace. The latter factor has proven to be especially disadvantageous for the operation of the device. In addition, when clamping the electrode section, the inner cylinder formed as a clamping bush has to be displaced in the direction of its longitudinal axis against a surrounding conical ring, so that the chucks may mechanically damage the new electrode section, at least at the start of the clamping motion causing possible subsequent fissure formation in the electrode.

To eliminate these disadvantages, the two cylinders and a third cylinder have been co-axially mounted (DE-AS No. 24 18 688), and guided for clamping of the new electrode section to be nippled in a longitudinal direction by a threaded nut, rotatable via a rack-and-pinion or a chain drive employing a motor arranged near the top portion of the outer cylinder. The motor, for nippling up of the electrode section, effects rotation of the intermediate cylinder and of the inner cylinder which is fixed thereto employing torsional strength, for which purpose a detent securing the inner cylinder against rotation during the chucking process is released.

Because of the design described above, such a device has an external diameter near the furnace which only slightly exceeds the electrode diameter. Moreover, the chucking and nippling up are accomplished employing only one joint motor, which it located at one side of the head of the device. While achieving a reduction in size, the overall height of the device is still relatively large, since the new electrode section to be newly nippled up is clamped at its lower end, the height of the device being still substantially larger than the length of the new electrode section. With the device in question, having the material disadvantage that three cylinders are provided each possessing the required lengths, the device is not only very costly in materials, but also is correspondingly heavy.

Both such nippling devices above have a common drawback; the new electrode section is grasped by a chuck which contributing to a complicated design for the entire device and moreover making difficult the acceptance of a new electrode section in the nippling up device, since the new section must be exactly aligned with the nippling device which must then be exactly thrust over the electrode section.

In a further known nippling up device (DE-OS No. 23 38 741), the electrode section to be connected with the electrode can be firmly clamped in a holding ring which is rotatable and adjustable for height with respect to the electrode holder on the furnace side. A support frame holds a support ring guided on the frame by suspension means. The support ring carries a drive means by which an electrode ring, suspended on the support ring and including a hydraulically actuated clamping means arranged on its periphery, is rotatable employing an interposed ring gear secured on said holder ring against the support ring. The holder ring is axially displaceable between the electrode and the electrode section corresponding to the thread pitch of the nipple connection. The suspension means is displaceable transversely to a longitudinal axis of the electrode and the support frame, designed with its relevant components as a portable unit, is provided with guide portions, by means of which it can be connected in a precisely defined position relative to the electrode holder. After completing the nipple connection between the electrode and the new electrode section, the nippling up device can, after releasing the holder ring clamping means, be lifted from the electrode holder employing a lifting appliance and can be used elsewhere.

But such a device also has a relatively complicated design due in part to a costly clamping means and in part to the special support frame needed for the support ring and for the holder ring. Consequently, the diameter of the device perpendicular to the axis of the electrode is substantially enlarged which can make operation of the device more difficult.

DISCLOSURE OF THE INVENTION

The object of the present invention is to create a simple, rugged reliable device for nippling combination electrodes making possible rapid and exact coupling and uncoupling of a combination electrode without substantial manual labor, and allowing rapid and precise denippling of a consumed electrode section on the lower end of the permanent top section of a combination electrode and subsequent nippling of a new active electrode.

This object is attained by a device consisting of an outer, substantially hollow cylindrical element, and an inner hollow cylindrical element which is arranged co-axially within said outer element; the inner element being designed as a coupling device which can be coupled to a combination electrode employing a connector means arranged on the upper end of the permanent section of the combination electrode.

A drive is provided by which the inner element is rotatable in relation to the outer element around its axis.

The inventive nippling up device is portable employing a lifting appliance, such as a shop crane.

For nippling up an unconsumed active section of an electrode to the lower end of a combination electrode, the inventive automatic nippling up device is coupled with the upper end of the permanent upper section of the combination electrode, the upper end of the permanent upper section of such electrode being configured accordingly, that is, having a connector element adapted to the coupling device of the nippling device. The combination electrode coupled can then be lifted from its furnace holder and can be moved to a suitable place adjacent the furnace where the consumed active electrode section is threadably detached and the new active section is screwed onto the lower end of the combination electrode. For the screwing process, the inner element of the inventive automatic nippling up device is rotated in relation to the outer element by the drive in the corresponding direction around a common axis. After nippling up, the renewed combination electrode is again moved over the furnace and lowered into the electrode holder. The nippling up device is decoupled and is available for a new work phase.

Means making possible the handling of active electrode sections both for denippling and for nippling may form a part of the coupling device.

The inventive nippling up means is characterized by a simple and weight-saving design. Both the outer and the inner elements are of a relatively short axial length.

The configuration of the inner element as a coupling, enable the nippling up device of the invention to work quickly and reliably. Moreover, the configuration of the coupling also contributes to simple assembly of the total arrangement.

A further advantage of the inventive nippling up device is that, in addition to being suitable for use with so-called combination electrodes, it can also be used for the operation of conventional electrodes. Such electrodes require only to be equipped with a connector element fitting the coupling device of the inventive nippling up device.

In one preferred embodiment, the inner element serves as a coupling device comprising a controllable locking means for detachable engagement with a connector element of an electrode, and an insertion means for movement of the connector element of the electrode to the locking means. The outer element includes a suspension means movable for shock absorption in the direction of insertion of the connector element relative to the locking means, to suspend the nippling up device on a lifting appliance.

The coupling device of the inventive nippling up device has a controllable locking means. Control of this locking means can be performed either automatically or manually by remote control, for example by the driver of a lifting appliance.

In order to avoid manual labor when connecting the nippling up device with the connector element of an electrode, the coupling device of the inventive nippling up device further has an insertion means by which the connector element of the electrode is forced into the area of the locking means. The driver of the lifting appliance, therefore, only has to lower the nippling up device approximately into the area of the connector element of an electrode, whereupon the coupling device including its locking means upon further lowering of the nippling up device, centers automatically relative to the connector element, so that the locking means of the coupling device safely engages the connector element of the electrode section.

The material of the electrodes concerned, that is, typically graphite, is highly sensitive to shock and the like. Care is necessary with the coupling device of the inventive nippling up device to avoid any damage to the electrode and/or its connector parts during the coupling process. Hence, the inventive nippling up device includes a suspension means movable for shock absorption in the direction of insertion of the connector means relative to the locking means. Due to this arrangement, impermissible shock forces between the nippling up device and the electrode when the electrode is raised or lowered, are compensated, avoiding damage to the electrode and to the other components as well.

In an alternate preferred embodiment, the locking means is fluid controllable, for example, pneumatically or hydraulically. Control of the lock can be effected, when mounting the nippling up device on the electrode section or when detaching the device from the electrode section either automatically or remotely by an operator, for example, a driver of the lifting appliance.

An especially simple design of the actual locking means comprises a lock bolt movable perpendicularly to the connector element insertion direction from an open position into a locked position and vice versa. Thereby, not only is the locking means itself particularly safe and simple in its design, but the result is also a trouble-free design of the connector element of the respective electrode section. This locking expediently bolt is movable by a pneumatic fluid or hydraulic fluid actuating cylinder, which permits such control opportunities.

To protect the actuating cylinder from rough operations during steel manufacture and to ensure reliable functioning, the actuating cylinder is arranged in the inner element above the locking bolt and acts along an axis parallel thereto.

Due to this arrangement, a simple design of the locking means becomes possible in that the piston rod of the actuating cylinder and the locking bolt are interconnected at their ends by a traverse connecting rod parallel to the direction of insertion.

In a particularly preferred embodiment of the inventive nippling up device, the coupling device can be automatically controlled, the actuating cylinder can be actuated by a control means so that when the nippling up device is being mounted on the connector element of an electrode, the locking bolt is moved from the open position to the locked position. When a tensile force acts upon the nippling up device, the locking bolt is detained in the locked position and/or in the absence of this tensile force or when a certain minimum value of said tensile force is not attained, the locking bolt is moved from the locked position into the open position.

In such an embodiment, when mounting the nippling up device on the connector element of an electrode, the control means can receive a control pulse causing, via the control means and the actuating cylinder, the locking bolt to move from the open position into the locked position by in any suitable or conventional method. It is possible to provide a mechanical sensor activated upon the connector element being fully inserted into the insertion means, that is, a position where the locking bolt of the coupling device can engage a corresponding opening in the connector element of the electrode section.

As long as the respective electrode hangs over the nippling up device from the lifting appliance, for safety reasons, care is required so that the locking means of the coupling device is not unintentionally released, for example, by an operator error. This measure is achieved in that, when a tensile force acts on the nippling up device, the locking bolt of the coupling device is detained in the locked position. By such a safety interlock, even actuation of a device intended to move the locking bolt from the locked position into an open position by means of the actuating cylinder will not function so long as tensile force acts upon the coupling device, such as while the electrode is suspended on the hook of the lifting appliance without any support beneath it.

When an electrode is lowered to the ground, or after the insertion of an electrode into the electrode holder of a furnace, the coupling device of the inventive nippling up device can be automatically released if necessary by hydraulic or pneumatic actuation, that is, without the approach of an operator to the device. For example, absence of tensile force, or when a certain minimum value of the tensile force acting on the nippling up device is not attained, will function to move the lock bolt from the locked position into the open position.

The tensile force acting on the nippling up device can be measured in any suitable or conventional way, and is used to initiate relevant commands to the locking means.

In one preferred embodiment, the suspension device comprises a suspension bracket supported movably on the outer element of the nippling up device by, for example, a spring arrangement, which to some extent counters the tensile forces arising in use. The control means for the actuating cylinder can then interact for safety interlock purposes with the spring arrangement of the suspension bracket. The control means senses the state of the spring arrangement to detect the action of tensile forces upon the nippling up device for initiating a safety interlock command for the locking means.

An embodiment employing a suspension means including a resilient suspension bracket provides a simple design, ensuring effective absorption of shocks occurring during the coupling process or during the raising and lowering of the electrode sections.

In an especially simple design of the insertion means for the connector element of an electrode section in the coupling device, the insertion means is composed of a conical wall element of the inner element, which narrows along an insertion axis or direction of insertion of the connector element of an electrode section into the coupling device. This conical, narrowing wall element can be formed integrally with the inner element. On the inner end of this conical wall element, a bearing for the actuation cylinder of the locking means can be attached.

It is further expedient that on the outer element a motor, preferably hydraulically drive, be arranged having a pinion engaging a ring gear upon the inner element, providing a simple drive for rotation of the inner element relative to the outer element.

According to one favorable embodiment of this drive means, an axis of the pinion can extend perpendicularly to the axis of the element and the ring gear can be arranged on the bottom face of the inner element, providing a small overall diameter.

In order always to connect the electrode section concerned precisely to the electrode concerned, it is advantageous that in the transmission between the motor and the inner element, a means for the limitation of torque be provided. This torque limitation means can be any conventional means.

To guide the pneumatic or hydraulic leads of the component groups of the inner element simply from outside into the movable inner element, these leads can be guided via a swivel joint mounted on the inner element. This swivel joint, too, can be of any conventional type.

The invention further provides for a feed device for at least one active electrode section, which interacts with the coupling device for the permanent section of the combination electrode.

This feed device is intended to denipple the used active electrode section from the combination electrode and/or to nipple up a new active electrode section on the lower end of a combination electrode to be newly equipped. The new electrode section can either be directly connected to the lower end of the upper permanent section (metal shaft) of the combination electrode or with the lower end of a still usable active electrode section. In both cases, a suitable screw nipple is to be provided.

The feed device must be suitable to accept and handle a consumed electrode section, generally still near its elevated operating temperature. A corresponding design of the feed device is therefore necessary for implementing the invention in practice.

The invention provides that the feed device comprises at least one chuck in which an active electrode section is held with torsional strength in the vertical position. The chuck can serve both to accept a consumed active electrode section and also a new active electrode section. In the first case by means of the chuck interacting with the nippling up device, the unscrewing of the used active electrode section from the rest of the combination electrode is effected, while in the second case the chuck and the upper nippling up device carry out the nippling up of the new electrode section to the lower end of the combination electrode. The rotary motion is caused by the upper nippling up device, while the lower electrode section is held with torsional strength in the chuck.

It is advisable for the chuck to comprise at least three hydraulically or pneumatically actuated clamping jaws which are radially movable in a horizontal plane.

These clamping jaws can be cooled and/or provided with a high-temperature resistant coating, for example, of graphite or the like. The pneumatic or hydraulic control means for the clamping jaws must also be designed to accept the extreme conditions in operation.

It is advantageous for the chuck to be arranged to be vertically resilient to compensate inadmissible shock forces in operation. Deviations in the axial position of the combination electrode in relation to the new electrode section to be nippled up can be approximately balanced out. Lastly, resilient axial movement for the screwing on and off processes can be provided between the combination electrode and the lower electrode section.

For screwing on and off of an electrode section, the the upper nippling up device can, of course, be correspondingly lifted or lowered, by corresponding control of the crane hook by the operator or by a control device programmed to correspond to the pitch of the thread of the screw nipple and the relevant boreholes on the electrode sections. It is especially advantageous when several chucks are provided including a movable support.

Such a movable support can be designed to be free or to move on rails or the like as a carriage. This carriage can be movable in a straight line or along a partial circuit. In this way, the same support or carriage can be provided with corresponding chucks to denipple in a predetermined timing, for example, controlled by a program, firstly the consumed active electrode section by means of a first chuck from the combination electrode, whereupon in the next cycle a second chuck with a new electrode section already mounted thereon is driven under the combination electrode and nippled up on the the combination electrode. In the meantime, the consumed electrode can already be removed from its chuck. Further chucks can be provided, which meanwhile are charged each with a new electrode section. In this way, electrodes can be rapidly reloaded. The entire sequence can be controlled by a control program, from the removal of the partly consumed electrode combination from the furnace of the insertion of a renewed combination electrode into the furnace.

It is further advantageous for the chuck to be arranged employing cross slides which can be indexed in the horizontal plane in both coordinate directions.

Due to the indexable chuck, the new electrode section can be exactly axially aligned relative to the upper portion of the combination electrode, avoiding damage or wear to the thread of the borehole and screw nipple where two electrode sections are being connected precisely aligned.

It is expedient for the cross slides to be controllable by a servo-hydraulic control. The coordinates are fed into the servocontrol via an optical measuring and positioning means, which determines the position of the upper portion of the combination electrode relative to the lower section to be connected with the upper electrode portions, and controls the entire regulator circuit so that the two parts to be connected are exactly aligned axially with each other. Both the hydraulic servocontrol and the optical measuring and positioning means can be of conventional configuration.

The foregoing features and advantages of the invention will become more clear when considered in conjunction with the description of the invention and accompanying drawings that follow forming a part of the Specification.

BEST EMBODIMENT OF THE INVENTION

Figure 1:
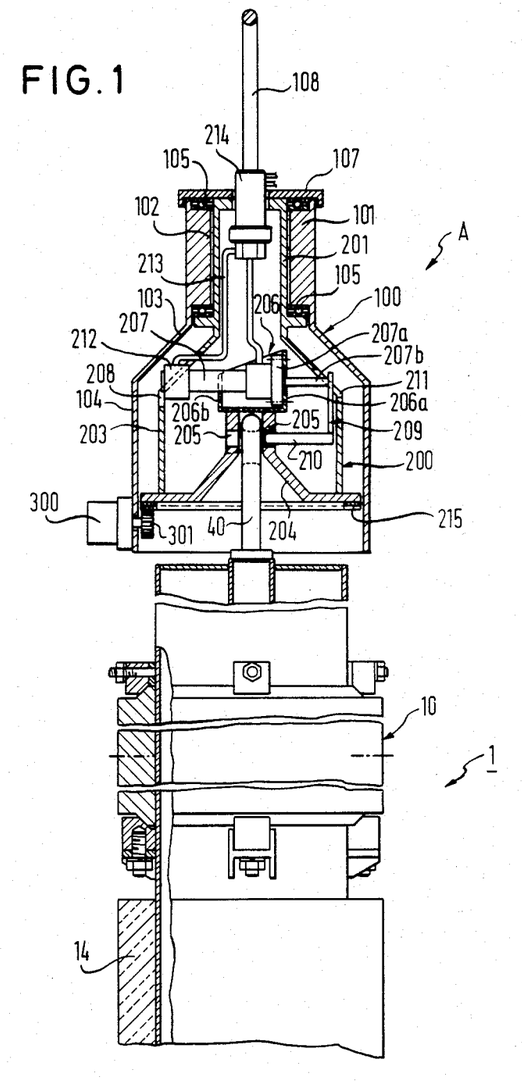
FIG. 1 depicts an upper part of a combination electrode and, in longitudinal section, the inventive upper nippling up device.
Figure 2:
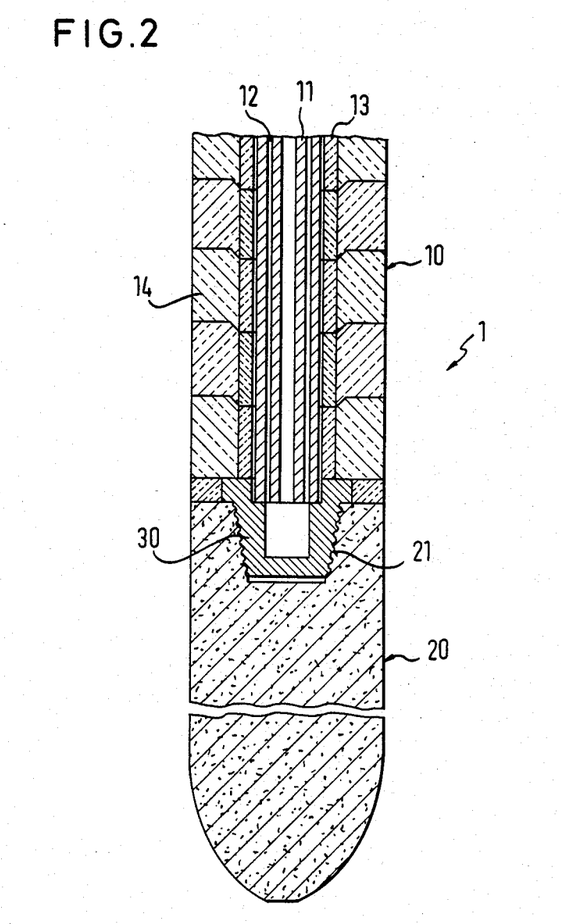
FIG. 2 depicts a lower part of a combination electrode in longitudinal section.

Referring to the drawings, FIGS. 1 and 2 in schematic depict a combination electrode marked as a whole by reference numeral 1 consisting of an upper permanent section 10 and a lower active section 20.

The upper permanent section 10 is mainly formed by a metallic shaft 11, for example, copper, having a cooling system including channels 12. The metal shaft 11 is protected against thermal and mechanical stresses by an inner protective sleeve 13 and an outer protective sleeve 14. These sleeves 13, 14 can be made of suitable material in conventional design.

The lower electrode section 20 comprises a consummable material such as graphite. The active electrode section 20 can be made of several sectors or part. The connection of the active electrode section 20 with the lower end of the upper permanent section 10 is made employing a screw nipple 30 having external threads, which is screwed into a bore or box 21 having an internal thread on the upper end of the lower active electrode section 20. Should the lower active section 20 itself consist of several parts, these sectors or parts, too, are interconnected by screw nipples.

The upper permanent section 10 of the combination electrode 1 is provided at its top end with a connector element 40, which has a bore which, in a manner to be described below in more detail, a locking bolt of the upper nippling device engages.

Figure 3:
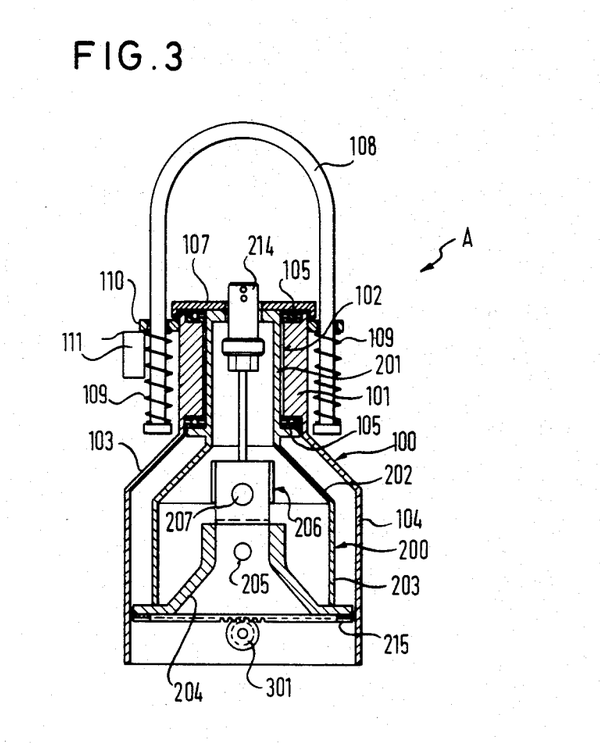
FIG. 3 depicts a section through an upper nippling up device in accordance with the invention, offset by 90° relative to the depiction of FIG. 1.

The upper nippling up device A is seen best in FIGS. 1 and 3.

As can be seen from these figures, the nippling up device A comprises basically an outer element 100 substantially hollow and cylindrical, and a co-axially arranged inner element 200 within said outer element, also essentially hollow and cylindrical.

The inner element 200 comprises a cylindrical bearing sleeve 201, an adjoining conical section 202, and an equally adjoining cylindrical section 203. The cylindrical bearing sleeve 201 of the inner element 200 is rotatably mounted in a bearing bore 102 of the outer element 100 in that two axial bearings 105 and a stop plate 107 are provided, whereby substantially axial forces can be transferred via the bearing arrangement just described.

The inner element 200 is designed as a coupling means. In the interior of the cylindrical section 203, an insertion means 204 narrows conically upwardly along an axis or in a direction of insertion of the connector 40.

In the insertion means wall 204, two locking bores 205 are provided, the axes of which are common, extending perpendicular to the common axis of both elements 100, 200. On the top inner end of the insertion means 204, a bearing casing 206 is supported in which a fluid actuated cylinder 207 of pneumatic or hydraulic type is mounted. A flange 207a of the cylinder 207 is screwed to a wall 206a, parallel to the common axis of the elements 100, 200 of the bearing casing. An additional support for the actuating cylinder 207 is effected on a wall 206b parallel to the wall 206a of the bearing casing 206. For easy insertion of the actuating cylinder easily into inner element 200, the latter has an assembly opening 208. A piston rod 207b of the actuating cylinder 207 is connected at its ends via a traverse or rod 209 parallel to the common axes of the elements 100, 200 to a locking or lock bolt 210, the axis of which is perpendicular to the common axes of elements 100, 200. The axis of the lock bolt 210 is aligned with the axes of the locking bores 205, so that the locking bolt 210 can engage the locking bore 205 and in this position it is supported by the locking bores 205. To facilitate the assembly of this arrangement, the relevant wall section of the inner element 200 is equipped with a second assembly opening 211.

To actuate the actuating cylinder 207, that is to move the piston and thus the piston rod 207b back and forth and thus to move the locking bolt 210, the actuating cylinder 207 is connected in usual manner to a control means, such as a magnet valve arrangement 212. This magnet valve 212 is in turn connected via a lead 213 to a swivel joint 214, which in turn is connected to a source of pressurized fluid. Thus, the hydraulic swivel joint 214 also permits the connection of the leads between a fixed source and the leads of the rotatable inner element 200.

To rotate the inner element 200 relative to the outer element 100 around their common axis, a hydraulic motor 300 is attached to the outer element 100 and is connected via the corresponding leads and the hydraulic swivel joint 214 with the fluid source. On an axis of the motor 300, perpendicular to the common axis of the elements 100 and 200, a pinion 301 is arranged engaging a ring gear 215 on the bottom face of the inner element 200.

To be able to suspend the nippling up device on a lifting apparatus hook such as one found on a shop crane, a U-shaped suspension bracket 108 is provided, which is supported via a pressure spring 109 on a support plate 110 connected with the outer element 100. Thus the suspension bracket 108 is movable in a direction of the common axis of elements 100 and 200, that is in the direction of insertion, and tensile forces acting on the nippling up device is absorbed by the pressure spring 109.

To measure tensile force absorbed by the pressure spring 109 during insertion of the nippling up device, this pressure spring 109 is connected with a measuring and positioning means 111 which is only schematically shown. Depending on the tensile force, the actuating cylinder 207 of the coupling device can be correspondingly controlled employing a control means 212.

The connector element 40 of the combination electrode 1 is inserted in the coupling device to couple; the locking bolt 210 of the coupling device engages the bore of connector element 40.

To couple a combination electrode 1 to the nippling up device A, the device A is lowered onto the upper end of the combination electrode 1 so that the connector element 40 of the combination electrode slides into the conical insertion means 204, for which purpose the locking bolt 210 is in its open position as shown in FIG. 1. As soon as the bore of connector element 40, together with the combination electrode 1, is flush with the two locking bores 205 of the coupling device of nippling up device A, the locking bolt 210 is pushed into the two locking bores 205 and into the bore of connector element 40 of combination electrode 1, employing the actuating cylinder 207. The requisite switching on of the actuating cylinder 207 can either be done by a sensor (not shown) actuated on insertion of the connector element 15 in the conical insertion means 204 of the nippling up device A or can be remotely controlled.

In this way, the combination electrode 1 is coupled with the nippling up device A. As long as the combination electrode 1 is suspended on the nippling up device and this in turn is hanging on the hook of the lifting appliance, and thus a corresponding tensile force is acting on the spring 109, the measuring and positioning means 111 prevents any unintentional release of the coupling device of nippling up device A by the displacement of the locking bolt 210 from the locked position into the open position.

To decouple the nippling up device A, from the combination electrode, by corresponding control of the actuating cylinder 207, for example by a remote control lead from an operator of the lifting appliance, the locking bolt 210 is moved from its locked position into the open position, so that nippling up device A can be removed from combination electrode 1.

Figure 4:
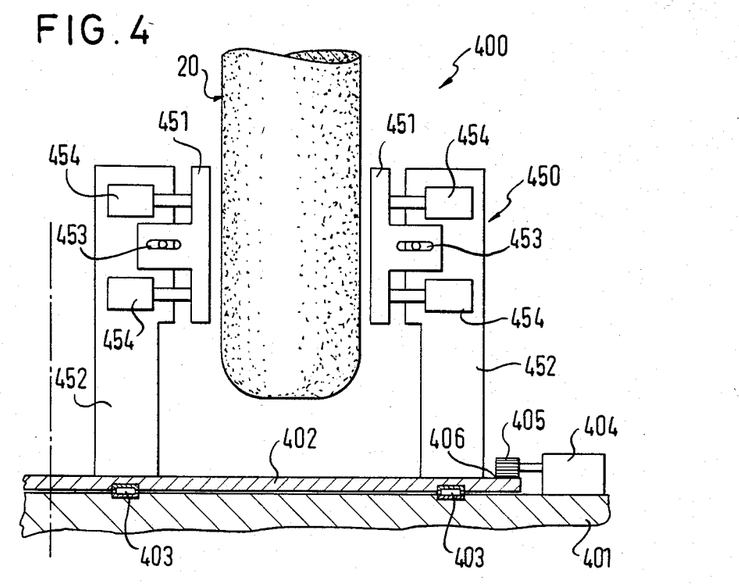
FIG. 4 depicts a side view of an embodiment of chuck or feed device for the active electrode sections being nippled up.
Figure 5:
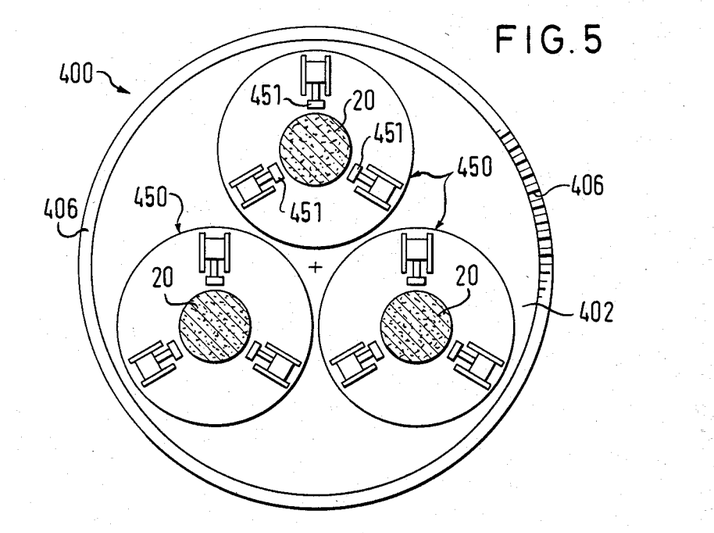
FIG. 5 depicts a plan view of the chuck arrangement of FIG. 4.

A feed device interacts with the nippling up device mentioned above and a first embodiment is shown thereof in FIGS. 4 and 5 marked as a whole with 400. This feed device is intended to handle the active electrode sections, which either are being unscrewed or are being nippled onto the lower end of the combination electrode 1.

According to FIGS. 4 and 5, the feed device 400 comprises a baseplate 401, on which a support 402 rotatable around a vertical axis and made in the form of a coiler plate is rotatably mounted. A rotatably bearing 403 is provided shown only schematically. To drive the coiler plate 402, a motor 404 is supplied, having a pinion 405 engaging a gearing 406 extending along an arc in said coiler plate 402.

On this coiler plate, three chucks 450 are arranged along a partial circle, equally spaced each from the other. Each chuck comprises three movable clamping jaws 451, which can be moved in a horizontal plane relative to each other. Each clamping jaw 451 is supported by a holder 452 and is displaceably mounted on the holder 452 such as by linear guides. For actuation, each clamping jaw 451 is allocated two hydraulic or pneumatic actuating cylinders 454. These actuating cylinders are controlled by a control means (not shown), in known manner, so that the clamping jaws 451 of the chuck are synchronized in motion in order thereby to be brought into exact abutment with an active electrode section, to clamp the latter electrode section with torsional strength along as exact as possible a vertical axis.

The feed device 400 interacts with the nippling up device A as follows:

The feed device 400 is placed at a suitable point near the furnace. The upper nippling up device A with a combination electrode 1 having a spent active electrode section suspended therefrom is moved into position over the feed device 400 whereby the spent electrode section can be lowered into an empty chuck 450. By actuation of the clamping jaws 451, the spent electrode section is fixed in said chuck 450 with torsional strength. This can be done at the operating temperature of the electrode. The clamping jaws 451 are cooled and/or are equipped with a coating which is highly resistant to mechanical and thermal stresses. After affixing the spent electrode section, the upper portion of the combination electrode is rotated relative to the spent electrode section so that the screw nipple is released. To do this, the inner element 200 of the upper nippling up device A is rotated correspondingly relative to the outer element 100 which can additionally be braced fixed if need be. In this way, the spent electrode section is unnippled from the combination electrode.

After unnippling of the spent electrode section, the coiler plate 402 is rotated by one division so that the next chuck 450, already laden with a new active electrode section, can be moved under the combination electrode. By raising or lowering the upper nippling up device A, care is taken that the screw nipple on the lower end of the combination electrode engages exactly in a bore at the upper end of the new active electrode section. Then, the upper portion of the combination electrode is rotated by the corresponding drive of inner element 200 relative to outer element 100 of the upper nippling up device A so that the screw nipple on the lower end of the electrode screws into the inner thread of the box on the upper end of the new active electrode section until the contact surfaces of the lower end of the combination electrode meet the contact surfaces of the upper end of the new active electrode section in the desired, electrically conducting position. The arrangement of the upper nippling up device A limits torque to prevent any excessive twisting of the thread of the screw nipple or of the bore on the new active electrode section.

During the above nippling up process, the unscrewed, spent electrode section can be removed from the chuck and a new electrode section can be inserted. Also during such work, a new electrode section can be inserted in the third chuck, for example and can be prepared for the nippling up process.

Figure 6:
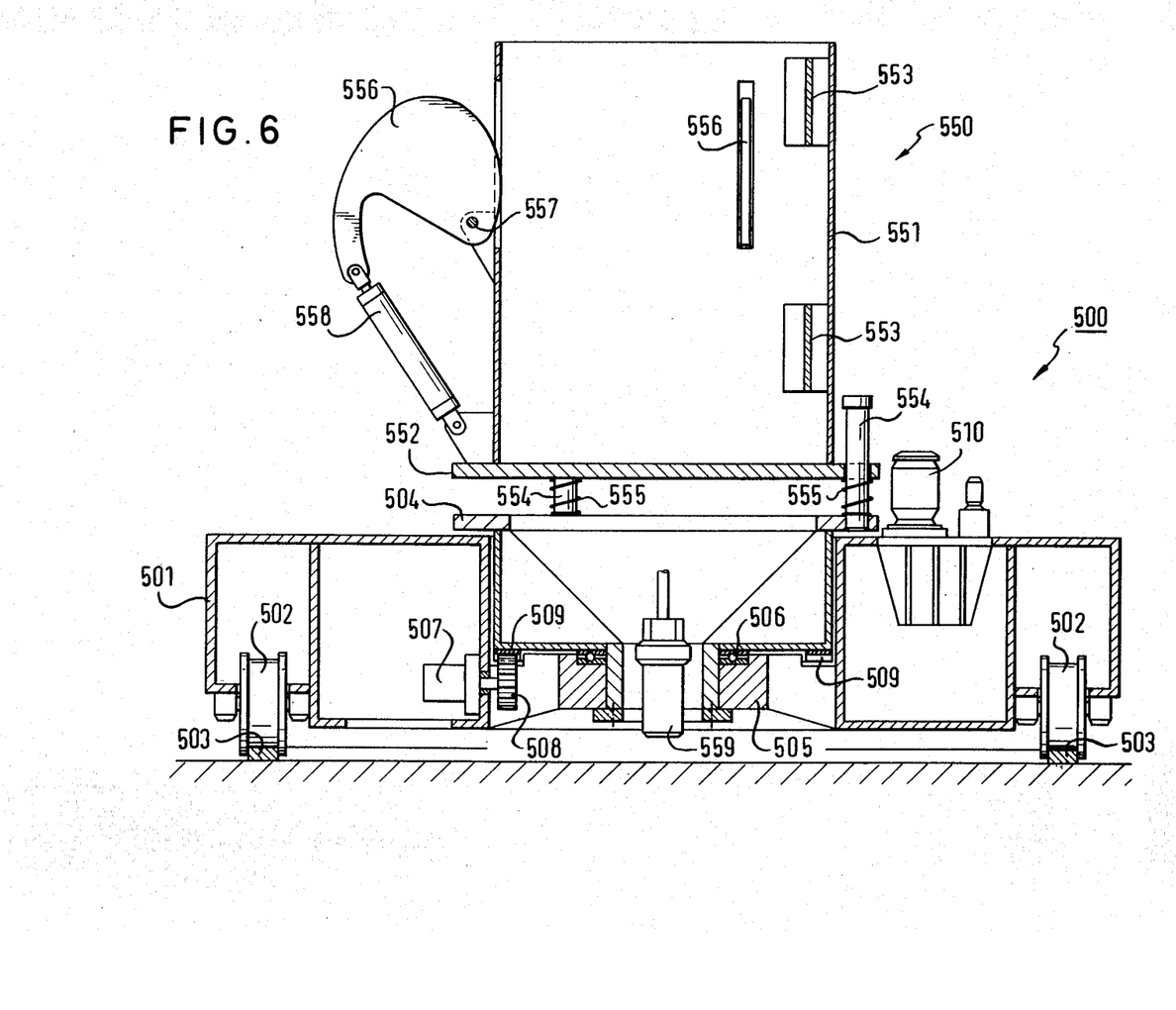
FIG. 6 depicts a section through an alternate embodiment of a device for feeding the active electrode sections.

FIG. 6 shows a second embodiment of the feed device, marked as a whole 500.

The feed device 500 comprises a carriage 501 movable on rollers 502 engaging rails 503 along a circle. On the carriage 501, a coiler plate 504 is mounted rotatable around a vertical axis. The carriage 501 has a bearing point 505 with axial bearings 506. To rotate the coiler plate relative to the carriage 501, a motor 507 is supplied having a pinion 508 engaging a ring gear 509 of said coiler plate 504.

The motor 507 can be a hydraulic motor actuated by a hydraulic source 510.

On the carriage 501, at least one chuck 550 is placed comprising vertical tube 551, open at the top and underneath is closed by a plate 252 projecting beyond the casing of the tube. The inner diameter of tube 551 is larger than the largest outer diameter of the active electrode sections to be used so that the latter can be inserted from above in the tube 551. On the inner wall of tube 551 are centering jaws 553, which center an electrode section during insertion in tube 551 so that the electrode section is aligned vertically as far as possible relative to its axis.

Tube 551 is mounted on the coiler plate 504 by three bolts 554 equidistant along a circle so as to be axially movable, whereby between the plate 552 and the coiler plate 504, pressure springs 555 are located. Impermissibly large shock forces which may arise during the insertion of an active electrode section into tube 551 can be accommodated by the springs 555 damage to the electrode sections being thereby avoided.

Further, at least three clamping jaws 556 are distributed around the tube 551. Each of these clamping jaws 556 is pivotably mounted on a bearing 557 surrounding a horizontal axis and is operatively connected with an actuating cylinder 558. Actuation of a respective actuating cylinder 558, pivots the clamping jaw 556 around a horizontal axis of the bearing 557, whereby in one pivot direction the clamping jaw engages a recess in tube 551 and can then abut the casing surface of an active electrode section therein and in the other direction, is withdrawn from the tube 551.

The actuating cylinder 558 can also be fed from the hydraulic installation 510. For this purpose, the leads (not shown) are led via a swivel joint 559 which is arranged in the axis of the coiler plate 504.

The feed device 500 and the associated chuck 550 function as follows:

Where a spent electrode section is to be denippled from a combination electrode, the latter is guided by means of the upper nippling up device A, over the tube 551, into a position in which the axis of the combination electrode is approximately co-axial with the axis of the tube 551. By lowering nippling up device A and thereby the combination electrode using a lifting appliance, the electrode section to be denippled is guided into tube 551 and thereby centered as precisely as possible axially by the centering jaws 553. The clamping jaws 556 are moved into the tube 551 to abut the casing of the electrode section fixing the casing with torsional strength, its axis vertical in the tube 551.

The electrode section can then be inscrewed from the rest of the combination electrode. To shorten this process, not only can the inner element 200 of the upper nippling up device A be rotated correspondingly relative to the outer element 100, but the tube 551 can also be rotated by a motor 507.

After unscrewing the spent electrode section from the combination electrode, the carriage 501 is moved by one division so that a further chuck already charged with a new electrode section comes under the combination electrode. For this purpose, the combination electrode might have to be slightly raised. The new electrode section is aligned in the new position of carriage 501 to be flush with the combination electrode being renewed. Screw nipples and boxes of the two electrode sections to be combined are then engaged, whereby both by actuation of the upper nippling up device A and of the coiler plate 504 of the lower feed device 500, the screwing on of the new electrode section to the combination electrode is achieved.

Following attachment of a consummable electrode section, the renewed combination electrode is removed from feed device 500 and positioned on the furnace using the nippling up device A and the crane. Then the upper nippling up device is removed from the combination electrode.

The chuck 550 also can be equipped to accept a spent electrode section at its operating temperature. The parts are designed so as to withstand great thermal and mechanical stresses. Thus, the components can be configured for cooling during thermal stress and/or can be provided with a thermally resistant coating.

Both the carriage 501 and the coiler plate 504 can be controlled by a means so that, when interacting with the upper nippling up device A, all carriage and coiler plate functions take place automatically or semi-automatically.

Figure 7:
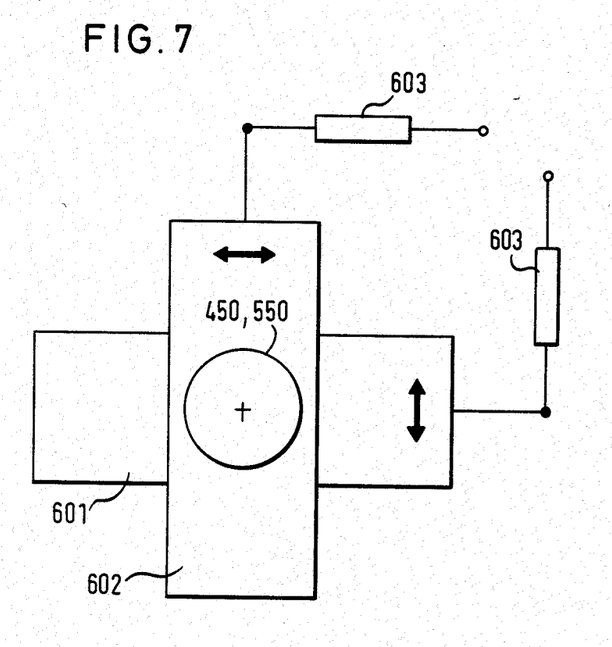
FIG. 7 depicts a cross slide arrangement for the chuck of a feed device.

In aligning a chuck for attaching or detaching an electrode section relative to the combination electrode, the chuck 450, 550 can be placed on an indexing means, shown schematically in FIG. 7.

This indexing means comprises two cross slides 601 and 602, whereby the chuck 450, 550 is arranged on the upper cross slide. Cross slides 601, 602 can be moved in a horizontal plane, along two coordinate axes, by a hydraulic servocontrol 603 shown only schematically, by means of which the exact desired alignment of the chuck 450, 550 relative to the respective combination electrode suspended on the upper nippling up device A may be attained. The cross slides 601, 602 can be arranged on the coiler plate 402 of the feed device 400 or on the coiler plate 504 of feed device 500.

The hydraulic servocontrol can be regulated by an optical measuring and positioning means which scans the respective positions of the chuck 450, 550 and of the upper nippling up device A and thus of the combination electrodes suspended therefrom and controls the cross slides 601, 602 so that exact alignment is achieved. Rough positioning is performed by the corresponding control of the coiler plate 402 of feed device 400 or of the carriage 501 of feed device 500.

We claim:

1. A coupling device for nippling and denippling active consummable electrode sections of a combination electrode joined by means of screw nipples comprising:
    an outer, essentially hollow cylindrical element and a second element also essentially hollow and cylindrical, arranged coaxially within said outer element;
    the inner element including locking means controllable for detachably engaging a connector element affixed to a combination electrode, and an insertion means having a wall element narrowing in a direction of insertion of the connector element into the coupling device to align the connector element with the locking means; the outer element having a suspension means shockabsorbingly movable along the insertion direction; and
    a drive configured to rotate the inner element in relation to the outer element around the co-axis.

2. The device according to claim 1, including a feeder having at least one chuck configured to hold an active electrode section fixedly in a vertical position co-axially with the upper section of a combination electrode, the chuck having at least three chuck jaws activated by a fluid under pressure and movable radially each with respect to the other in a horizontal plane.

3. The device according to claim 2, the chuck including means for imparting vertically resiliency.

4. The device according to one of claims 2 or 3, a plurality of chucks being arranged commonly upon a movable support.

5. A device according to claim 4, the chuck being mounted on cross slides indexable in a horizontal plane in both coordinate directions.

6. The device according to one of claims 2 or 3, the chuck being mounted on cross slides indexable in a horizontal plane in both coordinate directions.

7. The device according to claim 6, the cross slides being controllable employing a hydraulic servocontrol.

8. The device according to claim 7, the servo-control being controllable employing an optical measuring and positioning means.

9. The device of claims 1 or 2, the locking means comprising a lock bolt reversably movable perpendicularly to the insertion direction from an unlocked position to a locked position.

10. The device of claim 9, the locking means being controllable employing a fluid under pressure.

11. The device of claim 10, the lock bolt being movable employing an actuating cylinder actuated by a fluid under pressure, the actuating cylinder being arranged within the inner element vertically above the lock bolt and along an axis parallel to a direction of movement of the lock bolt.

12. The device according to claim 11, the actuating cylinder being actuated employing a control means whereby placement of the coupling device upon the connector element of a combination electrode actuates movement of the lock bolt from an unlocked position into a locked position and while a tensile force is exerted upon the coupling device, the lock bolt is detained in the locked position and while a predetermined minimal value of the tensile force is not attained, the lock bolt is free to move from the locked position into the unlocked position.

13. The device according to claim 12, a piston rod of the actuating cylinder and the lock bolt being interconnected by a traverse linkage configured to be parallel to the insertion direction.

14. The device according to claim 12, the suspension means comprising a suspension bracket movably supported on the outer element by springs, for at least partially counteracting tensile forces arising upon insertion.

15. The device of claim 14, the control means interacting with the springs of the suspension bracket to effect control decisions.

16. The device according to claim 12, the fluid under pressure being available to the inner element employing a swivel joint arranged on the inner element.

17. The device according to one of claims 1 or 2, a motor being positioned upon the outer element having a driven pinion drivingly engaging a ring gear associated with the inner element.

18. The device according to claim 17, an axis of the pinion extending perpendicularly to the co-axis of the hollow cylindrical elements, the ring gear being arranged upon a lower face of the inner element.

19. The device according to claim 17, a means for the limitation of torque being provided between the motor and the ring gear.

* * * * *

UNITED STATES PATENT AND TRADEMARK OFFICE
CERTIFICATE OF CORRECTION

PATENT NO. : 4,518,365
DATED : May 21, 1985
INVENTOR(S) : Schudlich et al

It is certified that error appears in the above-identified patent and that said Letters Patent are hereby corrected as shown below:

In the Cover Page:
Left hand column, after "[22] Filed: April 13, 1982" there should be inserted
--Foreign Application Priority Data April 16, 1981, [DE] Fed. Rep. of Germany 3115514--.

Signed and Sealed this

Eighth Day of October 1985

[SEAL]

Attest:

Attesting Officer

DONALD J. QUIGG

Commissioner of Patents and Trademarks—Designate